United States Patent [19]

Harmon

[11] Patent Number: 4,792,149

[45] Date of Patent: Dec. 20, 1988

[54] PEDAL-POWERED GOLF CART

[76] Inventor: Al L. Harmon, 5731 N. 210th Ave., Le Roy, Mich. 49655

[21] Appl. No.: 63,825

[22] Filed: Jun. 19, 1987

[51] Int. Cl.[4] .............................................. B62K 13/04
[52] U.S. Cl. .................................... 280/231; 280/236; 280/282
[58] Field of Search ............... 280/230, 231, 236, 237, 280/238, 282, 202, 289 A, DIG. 5, 260

[56] References Cited

U.S. PATENT DOCUMENTS

| 615,796 | 12/1898 | Brosnihan | 280/231 |
|---|---|---|---|
| 2,378,634 | 6/1945 | Hussey | 280/260 |
| 3,664,684 | 5/1972 | Long | 280/231 |
| 4,093,258 | 6/1978 | Ansel | 280/231 |
| 4,387,836 | 6/1983 | Laesch | 280/289 A |
| 4,533,013 | 8/1985 | Hightower | 280/DIG. 5 |
| 4,564,081 | 1/1986 | Hamane et al. | 280/289 A |

FOREIGN PATENT DOCUMENTS 50225  1/1940  France ................................ 280/231

*Primary Examiner*—John J. Love
*Assistant Examiner*—Donn McGiehan
*Attorney, Agent, or Firm*—Krass & Young

[57] ABSTRACT

A pedal-powered golf cart includes a pair of pedal assemblies disposed to drive the input shaft of a transmission, the transmission provides at least two output gear ratios at a drive shaft operatively connected to a gear box adapted to rotate a pair of driving wheels. The golf cart further includes a storage compartment and means for supporting at least one golf bag thereupon. The seats are separately adjustable with respect to each of the pedal assemblies.

10 Claims, 2 Drawing Sheets

PEDAL-POWERED GOLF CART

FIELD OF THE INVENTION

This invention relates generally to wheeled vehicles and more specifically to foot-powered vehicles and most specifically to pedal-powered golf carts.

BACKGROUND OF THE INVENTION

Golf is a game which is played by an ever-growing number of people. Golf carts which are adapted to carry golfers as well as their equipment between holes are presently in very extensive use on a great many golf courses. Golf carts allow for ease of play by golfers whose physical condition precludes walking long distances. Golf carts are also widely utilized because they speed up the play by decreasing travel time between holes, thereby enabling a higher throughput of players for a given course. Additionally, golf carts provide transport for clubs, drinks and other associated golfing equipment.

Heretofore, golf carts have been mechanically powered either by electric motors or gasoline engines. Such carts are expensive to buy and maintain, and necessitate charging bulky storage batteries, or accommodating the noise and exhaust fumes of gasoline engines. Many golfers are forced to forego the advantageous benefits of exercise attendant upon golfing because they must utilize golf carts in order to speed up play. It should thus be appreciated that a human-powered golf cart would confer several advantages insofar as it would provide benefcial exercise and would be a non-polluting, silent, simple, inexpensive and easy to maintain vehicle.

One particular pedal powered golf cart is disclosed in U.S. Pat. No. 4,431,205 of Speicher et al. Described therein is a tricycyle-like, single passenger golf cart driven by a long chain connected to a set of pedals. The golf cart of U.S. Pat. No. 4,431,205 can only accommodate a single player. Frequently, golf is played by pairs of players and it would be advantageous to have a golf cart which could simultaneously accommodate at least two players so as to allow for socialization during the game; additionally, the use of two pedalers would increase the efficiency of operation of the cart as opposed to one driven by a single pedaler, since inertia of the cart and players will increase in direct proportion to mass but frictional losses will not. It should thus be appreciated that it would be desirable to have a pedal-powered golf cart capable of being powered by and accommodating several players.

Golf course environments frequently include areas covered by high grass, rocks and sand. Such terrain is detrimental to a chain drive insofar as vegetation can catch in the chain and rocks and dirt can foul the chain. Therefore, it is desirable to have a golf cart which does not employ a long drive chain.

Two-passenger pedal-powered vehicles have been previously known and described, however, none of such vehicles have been adapted for use as golf carts and all of such vehicles employ a chain drive. For example, U.S. Pat. No. 776,357 of Shields discloses a foot-powered carriage having a multi-sprocketed chain drive. The carriage of Shields is adapted to be pedaled by two drivers; however, its complicated chain drive would make it impractical in a golf course environment. U.S. Pat. No. 565,117 and 615,796 both disclose foot-powered vehicles drives through a rocker arm and gear wheel assembly, neither of which are adapted for or suitable for use as golf carts.

It will thus be appreciated that there is a need for a two-passenger, foot-powered golf cart capable of traversing a variety of terrains. The instant invention fulfills this need by providing an easy to pedal golf cart capable of accommodating two passengers. The golf cart of the present invention does not include a chain drive and hence is quite reliable even under adverse conditions.

BRIEF DESCRIPTION OF THE INVENTION

The present invention provides a pedal-powered golf cart including two pedal assemblies adapted to rotate an input shaft, a transmission operatively connected to the shaft and adapted to provide at least two gear ratios and a drive shaft operatively connected to the output of the transmission and adapted to rotate a pair of drive wheels. The golf cart further includes a pair of seats each separately positionable with respect to the pedal assemblies and a directing wheel disposed so as to control the direction of travel of the golf cart.

In further embodiments of the invention, the cart includes means adapted to support at least one golf bag thereupon. In yet other variations, the directing wheel is operatively connected to a steering member disposed so as to be accessible from either of the pair of seats. In some instances, the steering member may be a T-shaped member further adapted to function as a handle adapted to assist the operators in pedaling the golf cart. The driving wheels may in some instances be low pressure wheels having a width of at least six inches and a diameter within the range of 12-14 inches.

The transmission may be adapted to provide three forward and one reverse gear ratio and the pedals may be operatively connected to rotate the input shaft by means of a chain drive. The golf cart may further include a storage compartment adapted to hold refreshments or spare golfing equipment and it is generally preferred that the golf cart be built upon a frame adapted to support the various components thereof.

DETAILED DESCRIPTION OF THE DRAWINGS

Figure 1:
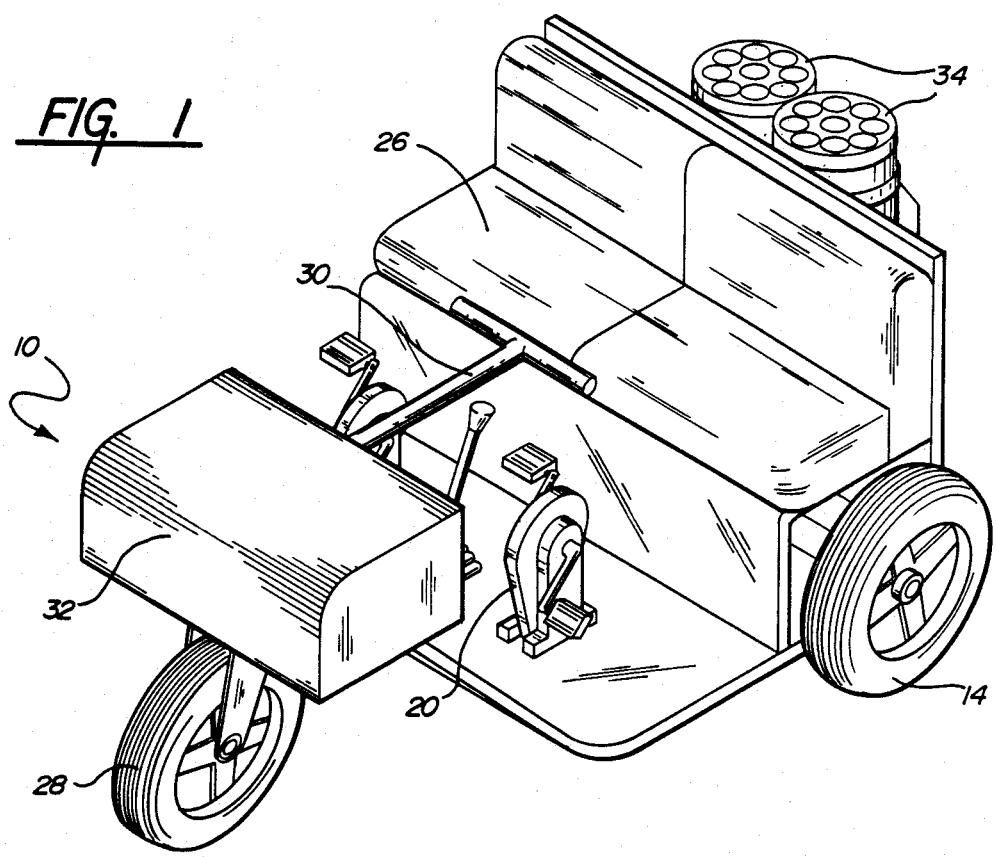
FIG. 1 is a perspective view of a golf cart structured in accord with the principles of the present invention.
Figure 2:
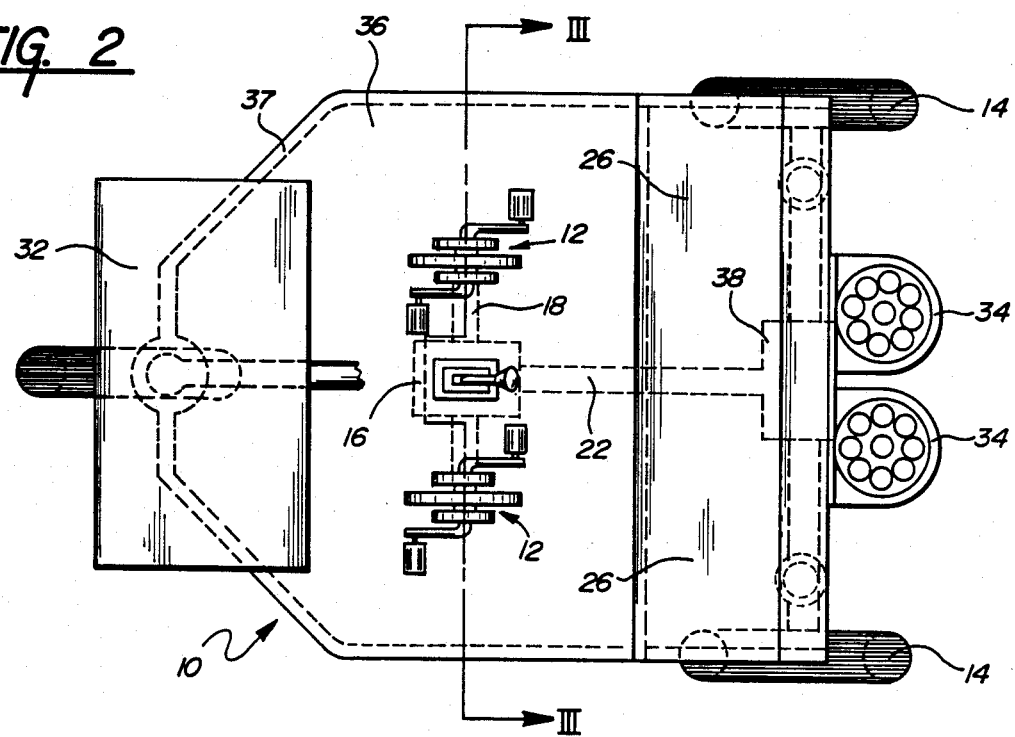
FIG. 2 is a top plan view of the golf cart of FIG. 1.

There are a wide variety of designs and styles of golf cart which may be structured in accord with the principles of the present invention. FIG. 1 depicts one such embodiment. As shown in FIGS. 1 and 2 a golf cart 10 includes two pedal assemblies 12 disposed so as to power a pair of drive wheels 14.

As is best shown by FIG. 2, power is transmitted from the pedals 12 to a transmission 16 via a transmission input shaft 18 operatively connected thereto. As depicted, the input shaft 18 is connected to the pedal assembly 12 by means of a drive chain 20. The output of the transmission 16 is transferred to a drive shaft 22 by means of a standard coupling such as a universal joint or the like. It is noteworthy that the golf cart of the present invention eliminates the need for a long chain drive communicating between the pedals and/or transmission and drive wheels 14. Such chains are prone to jamming by weeds, grass or debris and tend to accumulate large amounts of sand or dirt in a golf course environment and accordingly, elimination of such drive chains is one advantage of the present invention.

The golf cart further includes a pair of seats 26 disposed upon the frame and floor of the golf cart and individually positionably adjustable with relation to the pedal assemblies 12 most proximate thereto. In this manner, the seats may be adjusted to accommodate different sized users.

The golf cart 10 includes a directing wheel 28 disposed so as to control the direction of travel of the cart. The directing wheel 28 is moved by a steering assembly 30, which in this embodiment is configured as a tiller and is disposed so as to be readily accessible to a passenger in either of the two seats 26. In the particular illustrated embodiment, the handle of the steering tiller 30 is a T-shaped handle which the operators may push or pull on to assist in pedaling. As illustrated, the golf cart may further include a cargo compartment 32 adapted to store spare golf balls, refreshments, score keeping materials, towels and the like; additionally, the cart 10 may include a rack 34 adapted to support one or more sets of golf clubs. Obviously, other such variations and modifications of the basic structure illustrated may be similarly accomplished. For example, the cart may include a sun screen or shade mounted above the seats 26, or it may include an additional passenger seat.

Referring more specifically to FIG. 2, there is shown a top plan view of the golf cart of FIG. 1 better illustrating various components thereof. It wil be apparent from the figure that the golf cart 10 includes a floor 36 adapted to support the seats 26 and pedal assemblies 12. The floor may be formed from embossed metal, rubber covered metal, wood or other such non-slip material. The golf cart further includes a frame 37, shown here in phantom outline and adapted to support the floor 36, the transmission 16 and the various other components of the golf cart.

FIG. 2 better illustrates the positioning of the pedal assemblies 12 with respect to the seats 26 and illustrates the relative placement of the transmission 16, drive shaft 22 and driven wheels 14. As depicted, the drive shaft 22 communicates with the driven wheels 14 via a gear box 38. In most instances it will be sufficient that the gear box 38 be a "locked" gear box, that is to say a gear box without a differential joint therein. However, in some instances it may be advantageous to include such an assembly. By appropriate choice of gear ratios for the gear box 38 and the range of ratios provided by the transmission 16 as well as by choice of the appropriate gear ratio in the pedal assembly, ease of pedaling and velocity of the golf cart may be maximized. It is generally anticipated that three forward and one reverse gear will be sufficient for most uses, although in particularly hilly regions it may be advantageous to include a fourth, extra low, climbing gear. Selection of gear ratios is most advantageously accomplished by a shift lever associated with the transmission 16. Also apparent in FIG. 2 are the manner in which the storage compartment 32 and golf bag racks 34 are attached to the golf cart 10.

Figure 3:
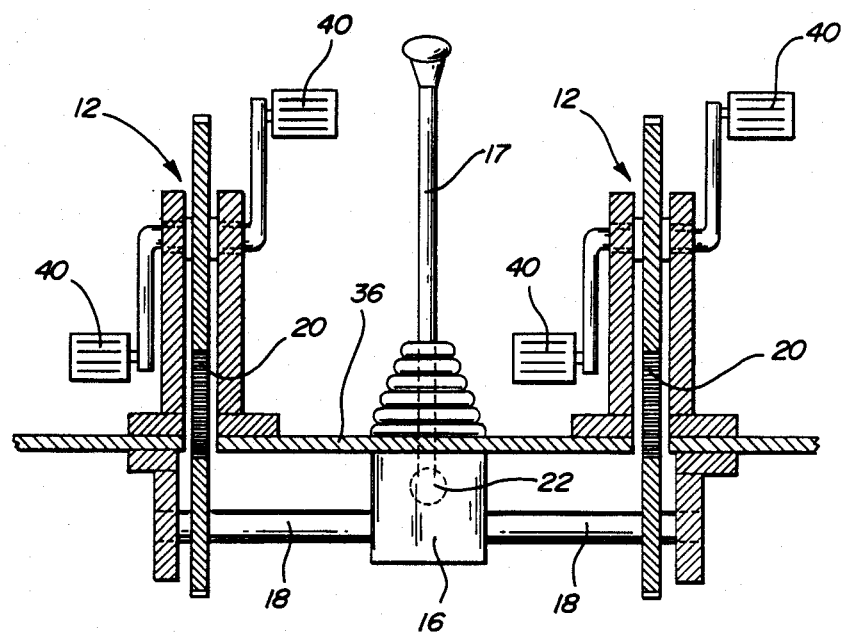
FIG. 3 is a cross-sectional view of the golf cart of FIGS. 1 and 2 taken along line III—III.

Referring now to FIG. 3 there is shown a cross-sectional view of the golf cart 10 taken along line III—III. Visible in the drawing of FIG. 3 is the transmission 16 having an input shaft 18 associated therewith. Also associated with the transmission 16, is a shift lever 17 for selecting the desired gear ratios. As illustrated, the shift lever 17 is placed so as to be readily accessible from either of the seats 26. Also apparent are the pedal assemblies 12, each of which includes a pair of pedal cranks 40 adapted to rotate a sprocket wheel having a drive chain 20 disposed thereabout. A corresponding sprocket wheel is provided on each portion of the input shaft 18 so that rotation of the pedal cranks 40 rotates the input shaft 18. As illustrated, the pedal assemblies 12 are supported upon the floor 36 of the cart and the transmission 16 is supported beneath the floor 36.

Figure 4:
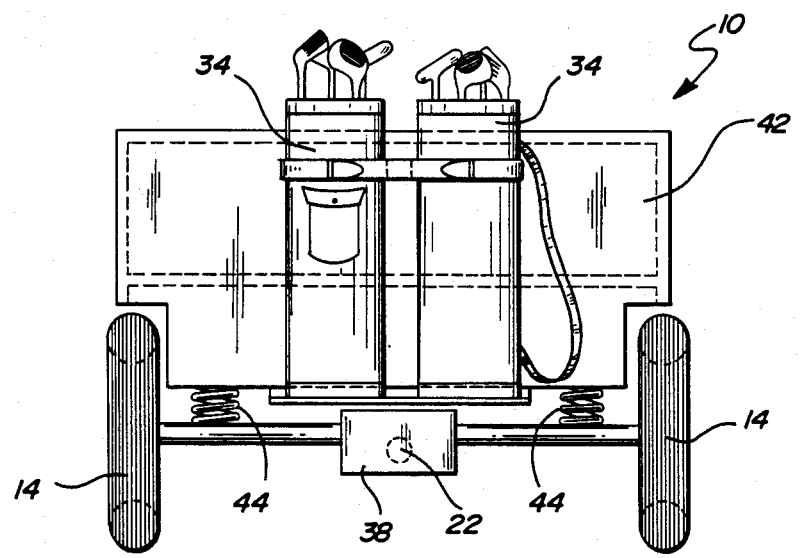
FIG. 4 is a rear view of the golf cart of FIG. 1.

Referring now to FIG. 4 there is shown a rear view of the cart 10 showing the back portions 42 of the seats, the golf bag racks 34, the rear gear box 38, the drive wheels 14 and a pair of coil springs 44 adapted to support the floor 36 of the golf cart upon the frame thereof.

In order to efficiently traverse golf course terrain it is preferred that the wheels of the golf cart, particularly the driving wheels be very low pressure wheels having a minimum width of six inches and a diameter of approximately 12-14 inches. It is further anticipated that all of the wheels have bearings, particularly sealed, packed bearings to minimize rolling friction. In light of the foregoing description it will be appreciated that there are a great many variations possible within the scope of the present invention. Accordingly, the foregoing drawings, description and discussion are merely meant to be illustrative of particular embodiments of the present invention and not limitations upon the practice thereof. Accordingly, it is the following claims, including all equivalents which define the scope of the invention.

I claim:

1. A pedal-powered golf cart comprising:
a snag-free drive train including:
two pedal assemblies each having a chain adapted to rotate an input shaft;
a transmission operatively connected to the input shaft and adapted to provide at least two gear ratios; and
a rotatable drive shaft operatively connected to the output of the transmission and to a pair of drive wheels for rotation thereof;
a pair of seats, each separately positionable with respect to the pedal assemblies; and
a directing wheel disposed so as to control the direction of travel of said golf cart wherein said pedal assemblies are operatively connected to the input shaft by means of drive chains having a longitudinal axis disposed at an angle to the horizontal to minimize snagging.

2. A golf cart as in claim 1 further including support means adapted to retain at least one golf bag.

3. A golf cart as in claim 1, wherein said directing wheel is operatively connected to a steering member disposed so as to be accessible from each of the pair of seats.

4. A golf cart as in claim 3, wherein said steering member is a T-shaped member further adapted to assist the operator in pedaling of the golf cart.

5. A golf cart as in claim 1, wherein said driving wheels include low pressure tires having a tread width of at least six inches and a diameter of 12-14 inches.

6. A golf cart as in claim 1, wherein the transmission is adapted to provide at least three forward and one reverse gear ratio.

7. A golf cart as in claim 1, further including a storage compartment.

8. A golf cart as in claim 1, further including a frame adapted to support the component members thereof.

9. A golf cart as in claim 8, further including a floor disposed upon at least a portion of the frame.

10. A pedal-powered golf cart including two pedal assemblies each having associated therewith a pair of pedal cranks, a sprocket wheel and a drive chain adapted to rotate a transmission input shaft;
- a transmission operatively connected to the input shaft and adapted to provide at least three forward and one reverse output gear ratio at an output shaft thereof;
- a rotatable drive shaft operatively connected to the output shaft of the transmission and adapted to rotate a gear box disposed so as to turn an axle coupled to a pair of drive wheels;
- a pair of seats, each separately positionable with respect to the pedal assemblies;
- a directing wheel disposed so as to control the direction of travel of the golf cart;
- a steering tiller operatively connected to the directing wheel and disposed so as to be accessible from either of the pair of seats, said steering tiller terminating in a T-shaped handle;
- a storage compartment disposed proximate the directing wheel; and,
- golf bag support means disposed upon the back side of at least one of the pair of seats,
- wherein the drive chain has a longitudinal axis which is disposed at an angle to the horizontal and the drive shaft is approximately horizontally disposed to minimize snagging caused by vegetation over which the cart may be driven.

* * * * *